United States Patent Office 3,578,705
Patented May 11, 1971

3,578,705
PROCESS FOR THE PREPARATION OF HOMOPHTHALIC ACID
Norman L. Wendler, Summit, Harry L. Slates, Florham Park, and Stuart Weber, Colonia, N.J., assignors to Merck & Co., Inc., Rahway, N.J.
No Drawing. Filed July 26, 1967, Ser. No. 656,001
Int. Cl. C07c 65/00
U.S. Cl. 260—521                                 10 Claims

ABSTRACT OF THE DISCLOSURE 3,5-diloweralkoxy homophthalic acids are prepared from 5,7-diloweralkoxy-1-indanones via the corresponding 2-oximo-1-indanones and 1,2-indandiones and are employed as intermediates in the total synthesis of d,l-Zearalenones.

This invention relates to a new and improved chemical synthesis of 3,5-diethers of homophthalic acid and to the use of the diethers so formed as intermediates in the synthesis of known compounds of high physiological activity. More particularly, this invention relates to the synthesis of 3,5-diloweralkoxy homophthalic acids from well known starting materials by an efficient and heretofore undescribed route; to the use of said 3,5-diloweralkoxy homophthalic acids as intermediates in the total synthesis of the physiologically active compounds, d,l-6-(10-hydroxy-6-oxo-trans-1-undecenyl)-β-resorcylic acid (now known as d,l-Zearalenone) and the 4-mono and 2,4-diether derivatives thereof; and to novel intermediates obtained in said synthesis and to processes for making such intermediates.

Heretofore, 3,5-diloweralkoxy homophthalic acids were available synthetically only by an erratic and low yield sequence originating from the self-condensation of acetone dicarboxylic ester. In the synthesis of the instant invention, however, all steps leading to the preparation of 3,5-diloweralkoxy homophthalic acid and its subsequent conversion into intermediates known to be useful in the synthesis of d,l-Zearalenone proceed in high and uniform yield. The process of the instant invention, therefore, constitutes a significant advance in the chemical arts.

The instant invention is based upon applicants' discovery that 3,5-diloweralkoxy homophthalic acid can be prepared readily according to the reaction scheme generally set forth in Sequence A, below, and that the 3,5-diloweralkyl homophthalic acid so produced can be converted according to the reaction scheme generally set forth in sequence B, below, to 2-formyl-4,6-diloweralkoxy benzoic acid, a known intermediate useful in the total synthesis of d,l-Zearalenone. All steps in the process of the instant invention proceed readily in a straight forward manner and require nothing other than that apparatus and equipment conventional to the chemical laboratory.

SEQUENCE A

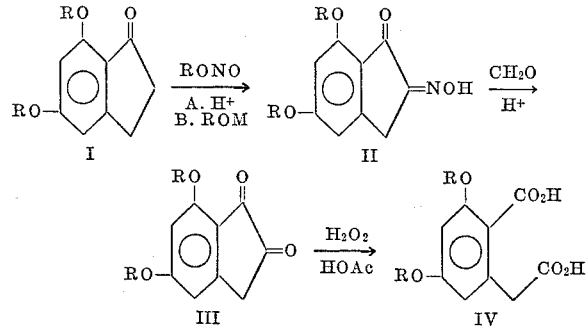

R=lower alkyl
M=alkali metal

SEQUENCE B

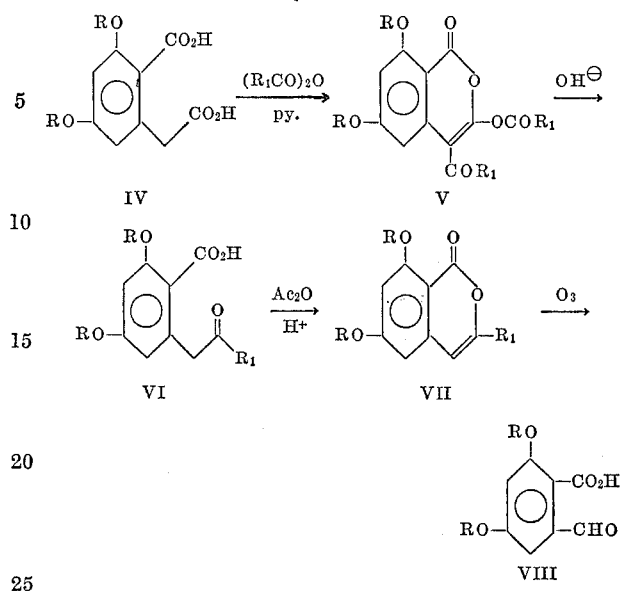

R=lower alkyl
R₁=H, lower alkyl, aryl

The starting material employed in the synthesis of 3,5-diloweralkoxy homophthalic acid according to Sequence A is 5,7-diloweralkoxy-1-indanone (I). This material is readily available in high yield by the cyclization of 3,5-diloweralkoxy propionic acid according to methods well known in the art. Treatment of the indanone (I) in an inert organic solvent, such as methanol, ethanol, dioxane and the like, with an alkyl nitrite, such as for example, n-butyl nitrite, amyl nitrite, and isoamyl nitrite, results in the formation of the corresponding 2-oximino indanone (II). The reaction may be catalyzed by either acid or base according to the techniques described below.

The acid catalyzed reaction is carried out in the presence of a strong mineral acid, such as hydrochloric acid, which, in concentrated form, is added slowly to the reaction mixture in order to maintain a reaction temperature of about 50 °C. Reaction usually is complete in about 30 minutes after which the crude oximino indandione is separated from the reaction mixture by filtration. The recovered crude produce is thoroughly washed with cold inert organic solvent and purified by recrystallization in the conventional manner.

The base catalyzed reaction is conducted in the presence of an alkali metal alkoxide, such as sodium or potassium alkoxides. Desirably, though not necessarily, the alkyl moiety of the alkali metal alkoxide will be the same as the alkyl moiety of the alkyl nitrite employed in the reaction. The alkali metal alkoxide conveniently is formed in situ by the reaction of alkali metal with the corresponding alkanol. Reaction is carried out by combining the reactants at about 0° C. warming the mixture slightly and aging under refrigeration for about 24–36 hours. Benzene is then added and the mixture is concentrated by evaporation. The residue is diluted with water, extracted with ether and the washed aqueous layer is treated with carbon dioxide. The precipitated product is recovered by filtration.

The oximino indanone prepared above is next converted into the corresponding indandione (III) by exchange hydrolysis with formaldehyde in the presence of a strong mineral acid. This reaction may be carried out by adding the oximino indanone to a mixture of aqueous formaldehyde (about 37 percent) and concentrated acid (concentrated hydrochloric acid, for example). The reaction mixture is stirred at about room temperature for 2 to 3 hours, diluted with water, and the precipitated product recovered by filtration. The crude indandione is purified by conventional recrystallization using inert organic solvents such as methylene dichloride, methanol, ethanol, ether and the like or mixtures of such solvents.

Alternatively, the indandione (III) may be prepared from the indanone (I) by converting the indanone into the corresponding 2-benzylidene derivative (i.e. 5,7-diloweralkoxy - 2 - benzal - 1 - indanone) which is then converted into the indandione by ozonolysis. These reactions may be carried out readily as follows.

The indanone (I) in alkanolic solution (i.e. methanol, ethanol, and the like) is treated with benzaldehyde in the presence of aqueous base (about 15 percent potassium hydroxide, for example). The reaction mixture is allowed to stand overnight at room temperature and the crystallized product is separated by filtration and purified by conventional recrystallization from one or a mixture of solvents such as acetone, dioxane and hexane.

The product so obtained in alkanolic solution is then treated with ozone at about −10° C. until an orange color is obtained with potassium iodide indicator. The reaction mixture is then treated with excess methyl sulfide and stirred at room temperature overnight. After concentration in vacuo, ether is added to the residue from the reaction and the solid product is separated by filtration and purified by recrystallization in the usual manner.

Oxidation of the indandione provides the desired 3,5-diloweralkoxy homophthalic acid (IV) directly in pure form. The reaction is carried out by dissolving the indandione in a 60 to 80 percent mixture of acetic acid in an inert organic solvent, such as chloroform, and treating the solution at about 0° C. to about 5° C. with a mixture of about 10 to about 20 percent hydrogen peroxide in a lower alkanoic acid, such as acetic acid, or with an organic per acid, such as peracetic acid, or perbenzoic acid in an inert organic solvent, such as chloroform, benzene, ethyl acetate and methylene chloride. The reaction mixture is held at about 0° C. to 5° C. for 8 to 10 hours; warmed to room temperature; diluted with water and held at room temperature for an additional 6 to 10 hours. Concentration under vacuum at about 50° C. yields the crude acid which is purified by recrystallization from an inert organic solvent, such as acetone, hexane, ethyl acetate and the like, or from mixtures of such solvents.

As a further alternative, 3,5-diloweralkoxy homophthalic acid may be obtained from the oximino indanone (II) without going through the indandione (III). This method involves conversion of the oximino indanone into the corresponding para-toluene sulfonate derivative by treating the oximino indanone in pyridine with para-toluene sulfonyl chloride. The 5,7 - diloweralkoxy - 2 - oximino - 1 - indanone para-toluene sulfonate is recovered by concentrating the reaction mixture to dryness. This material is then treated with an aqueous base, such as 20 percent aqueous potassium hydroxide, at room temperature to produce 2 - carboxy - 3,5 - diloweralkoxyphenylacetonitrile. The reaction mixture, without isolation of the nitrile, is then heated under reflux for 3 to 4 hours to obtain the desired 3,5-diloweralkoxy homophthalic acid which is recovered by conventional techniques from the aqueous phase after extracting the reaction mixture with ether.

As noted above, applicants have discovered that 3,5-diloweralkoxy homophthalic acids can be employed as intermediates in a new synthetic scheme leading to the ultimate total synthesis of d,l-Zearalenones, compounds known to display significant anabolic activity in animals as well as esterogenic and uterotrophic activity. The novel synthetic scheme contemplated by applicants involves the conversion of 3,5-diloweralkoxy homophthalic acid into 2 - formyl - 4,6 - diloweralkoxy benzoic acid, a compound heretofore described as a key intermediate in the total synthesis of d,l-Zearalenone. The steps in this conversion are described generally in Sequence B, above, each step readily affording the desired product.

Treatment of 3,5-diloweralkoxy homophthalic acid with an organic acid anhydride, such as, for example, acetic anhydride, butyric anhydride, benzoic anhydride and the like in the presence of pyridine yields 3 - acyloxy - 4 - acyl - 6,8 - diloweralkoxy isocoumarin (V). This reaction is carried out by dissolving the homophthalic acid in the anhydride with warming and then adding to the solution about a half volume of pyridine. The reaction mixture is aged at room temperature for about 1 to 2 hours and the precipittaed crude isocoumarin is separated by filtration. The crude product is purified by recrystallization in the usual way from one or a mixture of solvents such as dioxane, acetone, hexane, methanol and the like.

Hydrolysis of the isocoumarin (V) with an aqueous inorganic base, such as potassium or sodium hydroxide, yields the diloweralkyl ether of C-acyl orsellinic acid (VI). The hydrolysis is conveniently carried out by suspending the isocoumarin in the aqueous alkali heated on a steam bath. After 1 to 2 hours, the reaction mixture is acidified and crude product is recovered by filtration and purified by conventional recrystallization.

The derived orsellinic acid (VI) is next converted into 3-$R_1$-6,8-diloweralkoxy isocoumarin (VII) by cyclization. Desirably, this reaction is carried out by dissolving the orsellinic acid in a suitable inert organic solvent, such as ethyl acetate and methylene chloride, and treating the solution with a mixture of acetic anhydride and a catalytic amount of strong anhydrous acid, such as p-toluene sulfonic acid, sulfuric acid, perchloric acid and the like. The reaction is complete almost immediately and the product can be separated by filtration and purified by recrystallization in the usual way.

Alternatively, the isocoumarin (VII) can be prepared from the orsellinic cid (VI) by thermal cyclization. Cyclization is effected by holding the orsellinic acid as a melt at about 200° C. for 1 to 2 hours. The melt is then cooled, dissolved in an inert organic solvent such as chloroform and washed with potassium bicarbonate. After concentration to dryness in vacuo, the crude product is purified by conventional recrystallization from an inert organic solvent or mixture of solvents as previously described.

Finally, the isocoumarin (VIII) is converted into 2-formyl-4,6-diloweralkoxybenzoic acid (VIII) by oxonolysis. This reaction is carried out by dissolving the isocoumarin in a suitable organic solvent, such as methylene dichloride, ethyl acetate or the like, which has been cooled to between about −40° to about −70° C. Ozone is then passed through the solution until an orange color is obtained with potassium iodide indicator. The system is then flushed with nitrogen and slowly allowed to warm to room temperature. Desirably, the ozonide so formed is treated in situ without isolation by catalytic hydrogenation. The reaction mixture after hydrogenation is filtered, concentrated in vacuo and the residue extracted with aqueous potassium bicarbonate. The aqueous phase is then separated, acidified and extracted with a suitable organic solvent, such as ethyl acetate. The organic phase is concentrated to dryness in vacuo to yield the crude aldehyde acid. Purification is effected by conventional recrystallization.

As noted heretofore, compound (VII), 2-formyl-4,6-diloweralkoxybenzoic acid, is an intermediate known to be useful in the synthesis of d,l-Zearalenones. This compound, specifically the dimethyl ether, is the aromatic component employed by Taub et al. in the total synthesis of d,l-Zearalenone reported in Chemical Communications (1967) on page 225. Thus, the instant invention not only affords a novel and improved method for the preparation of 3,5-diloweralkoxy homophthalic acids but also a new approach to the total synthesis of compounds of significant pharmacological activity.

The best mode contemplated by applicants for carrying out their invention will now be set forth as follows.

EXAMPLE 1

5,7-dimethoxy-2-oximino-1-indanone (II)

(A) Acid catalyzed: Dissolve 5.0 gm. of 5,7-dimethoxy-1-indanone in 16 ml. of methanol containing 7.5 ml. of isoamyl nitrite. Slowly add concentrated hydrochloric acid to maintain a reaction temperature of about 50° C. Stir vigorously for about 30 minutes. Separate the precipitated solids by filtration and wash with cold methanol and ether. Purify by recrystallization from methanol with carbon treatment.

(B) Base catalyzed: Add 960 mg. of 5,7-dimethoxy indanone at 0° C. to 120 mg. of sodium dissolved in 5 ml. of isoamyl alcohol and add 702 mg. of isoamyl nitrite dissolved in 10 ml. of isoamyl alcohol. Allow the mixture to warm slightly and age under refrigeration for 24 to 36 hours. Add benzene and concentrate on an evaporator. Dilute the residue with water, extract with ether and treat the washed aqueous layer with carbon dioxide reserving the filtrate for further treatment. Recover the precipitated product by filtration. Acidify the filtrate and separate additional precipitated product by filtration.

EXAMPLE 2

5,7-dimethoxy-2-benzal-1-indanone

Dissolve 100 mg. of 5,7-dimethoxy-1-indanone in 1.5 ml. of ethanol and treat with 0.1 ml. of benzaldehyde and 1 ml. of 15 percent aqueous potassium hydroxide. Allow the reaction mixture to stand overnight and separate crystalline solids by filtration. Purify by recrystallization from acetone-hexane.

EXAMPLE 3

5,7-dimethoxy-1,2-indandione (III)

(A) Add 200 mg. of the oximino indanone prepared in Example 1 with stirring to a mixture of 3 ml. of 37% aqueous formaldehyde and 1 ml. of concentrated hydrochloric acid. Stir at room temperature for 2.5 hours; dilute with water and separate precipitated solids by filtration. Purify by recrystallization from methylene chloride-ether.

(B) Ozonize a solution of 2.0 gm. of the benzylidine-indanone, prepared according to Example 2, in 200 ml. of methonal at about −10° C. until an orange color is obtained with potassium iodide indicator. Add an excess of methyl sulfide and stir overnight at room temperature. Concentrate the reaction mixture in vacuo, add ether and separate the solids by filtration. Recrystallize from ethyl acetate.

EXAMPLE 4

3,5-dimethoxyhomophthalic acid (IV)

(A) Add 280 mg. of the indandione prepared in Example 3 to a mixture of 10 ml. of acetic acid and 3 ml. of chloroform at 5° C. Add 0.8 ml. of 10% hydrogen peroxide in acetic acid. Hold at 5° C. overnight. Allow the reaction mixture to warm to room temperature; dilute with 5 ml. of water and allow to stand at room temperature overnight. Evaporate the solvent from the reaction mixture in vacuo at about 50° C. Purify the crude product by recrystallization from acetone-hexane.

(B) Dissolve 600 mg. of 5,7-dimethoxy-2-oximino-1-indanone in 12 ml. of pyridine at room temperature and add 0.75 gm. of para-toluene sulfonly chloride. Stir the mixture overnight and concentrate the reaction mixture to dryness. Add 25 ml. of 20 percent potassium hydroxide. Saponify the resulting nitrile under reflux for about 3 to 4 hours. Cool the reaction mixture and extract with ether. Acidify the aqueous phase, take up into ethyl acetate and reextract with aqueous potassium bicarbonate. Acidify the aqueous phase, take up into ethyl acetate, dry and crystallize by evaporation.

EXAMPLE 5

3-acetoxy-4-acetyl-6,8-dimethoxy-isocoumarin (V)

Dissolve 300 mg. of 3,5-dimethoxyhomophthalic acid in 6 ml. of acetic anhydride with warming. Cool to room temperature and add 3 ml. of pyridine. Age at room temperature for 1.5 hours, filter and wash with ether. Recrystallize from acetone-hexane.

EXAMPLE 6

C-acetyl-o-orsellinic acid dimethyl ether (VI) (2-carboxy-3,5-dimethoxyphenyl acetone)

Suspend 306 mg. of isocoumarin prepared in Example 5 in 5 ml. of water containing 80 mg. of sodium hydroxide and heat on a steam bath for one hour. Cool to room temperature, acetify with concentrated hydrochloric acid, separate the precipitated solids by filtration and air dry. Purify the crude product by recrystallization from acetone-hexane.

EXAMPLE 7

3-methyl-6,8-dimethoxyisocoumarin (VII)

(A) Catalytic cyclization method: Add 0.05 ml. of 70% perchloric acid and 4.8 ml. of acetic anhydride to 40 ml. of ethyl acetate. Bring the solid up to a volume of 50 ml. with additional ethyl acetate. Add 500 mg. of 2-carboxy-3,5-dimethoxyphenyl acetone prepared in Example 6. Separate precipitated solids by filtration. Purify by recrystallization from acetone-hexane.

(B) Thermal cyclization: Melt a 500 mg. sample of 2-carboxy - 3,5 - dimethoxyphenyl acetone prepared in Example 6 and hold at 200° C. for one hour. Allow the melt to cool at room temperature, dissolve in methylene chloride and wash with 5% aqueous potassium bicarbonate. Concentrate the organic phase to dryness in vacuo and purify the crude product by recrystallization from acetone-hexane.

EXAMPLE 8

2-formyl-4,6-dimethoxybenzoic acid

Cool a 500 mg. sample of the isocoumarin prepared according to Example 7 in 80 ml. of methylene chloride in a Dry Ice-acetone bath to about −70° C. Pass ozone through the solution until an orange color is produced in a potassium iodide indicator. Flush the system for about 15 minutes with nitrogen. Allow the system slowly to return to room temperature. Hydrogenate the reaction mixture over a platinum catalyst, filter, concentrate in vacuo and extract the residue with aqueous potassium bicarbonate. Acidify the aqueous layer, extract with ethyl acetate and concentrate the organic layer to dryness in vacuo. Purify by recrystallization from acetone-ether.

The following examples will more fully illustrate the use of 2-formyl-4,6-diloweralkoxybenzoic acid, compound (VIII), in the total synthesis of d,l-Zearalenones according to the process described in the Taub et al., paper noted above.

EXAMPLE 9

2-(pent-4-e-yl)-6-methyl-$\Delta^2$-dihydropyran

To a stirred suspension of 7.296 g. (0.2968 mole) of activated magnesium in 40 ml. of dry ether there is added a solution of 35.397 g. (0.2375) of 1-bromo-4-pentene in 90 ml. of dry ether under an atmosphere of nitrogen. This is accomplished by first adding a small amount of the bromo compound and heating the mixture to reflux in order to initiate the reaction. The remaining amount of bromopentene is added at a rate such that the reaction mixture refluxes without an external source of heat. After the addition is complete (1⅓ hours), the reaction mixture is refluxed for an additional 40 minutes and then cooled to room temperature. The 4-pentenyl magnesium bromide Grignard reagent thus prepared is added dropwise to a stirred solution of 27.108 g. (0.2375 mole) of 2-hydroxyhexanoic acid-δ-lacton (5-hydro-2-δ-hexano-lactone) in 300 ml. of dry ether at —15° C. over a 2 hour period and under an atmosphere of nitrogen. The resulting heterogenous reaction mixture is stirred at —10° C. for 30 minutes and then treated with a saturated aqueous solution of ammonium chloride. The aqueous layer is extracted with ether. The ether solution and extracts are combined and extracted with 5% aqueous sodium hydroxide in order to remove any unreacted lactone. The ether solution is then washed successively with water, saturated ammonium chloride and saturated sodium chloride. It is then dried over anhydrous sodium sulfate, and the ether removed by evaporation in vacuo. The residue, which contains a large proportion of 10-hydroxy-1-undecen-6-one, is distilled in vacuo to afford 2-(pent - 4 - enyl)-6-methyl-Δ²-dihydropyran.

EXAMPLE 10

2-(pent-4-enyl)-2-methoxy-6-methyl tetrahydropyran 40 ml. of 1% HCl-methanol solution is added, with stirring to 15.3 g. of 2-(pent-4-enyl)-6-methyl-Δ²-dihydropyran at 0° C. With the first addition of about 1 ml. of 1% HCl-methanol the temperature of the reaction mixture rises to about 50° C. It is cooled to 25° C. and the rest of the methanolic hydrogen chloride is added at that temperature. The mixture is stirred for 3½ hours, and then an excess of solid sodium bicarbonate is added to it. It is stirred for 15 minutes at room temperature and the reaction mixture then filtered to remove the solids. The filtrate is evaporated to a residue at 30° C. under vacuum. A small volume of ether is added, the mixture filtered, and the filtrate distilled in vacuo to give 2-(pent-4-enyl)-2-methoxy-6-methyl tetrahydropyran as a colorless oil.

EXAMPLE 11

2-methoxy-6-methyl tetrahydropyran-2-butyraldehyde

A solution of 9.915 g. of 2-(pent-4-enyl)-2-methoxy-6-methyl tetrahydropyran in 100 ml. of dry methanol is treated with a steady stream of 3% ozone at —70° C. until the effluent gas turns starch-potassium iodide indicator blue. Addition of ozone is then stopped and excess ozone removed by bubbling nitrogen through the reaction mixture. This mixture contains the ozonide of 2-methoxy-6-methyl tetrahydropyran-2-butyaldehyde, which may be used directly without isolation or further purification in the next step of the process.

EXAMPLE 12

2-(δ-hydroxybutyl)-2-methoxy-6-methyl tetrahydropyran

The methanolic solution of ozonide obtained as in Example 11 is brought to about —20° C., and 9.45 g. of solid sodium borohydride is added slowly to it at a rate such that the temperature does not exceed 0° C. The mixture is then stirred for ½ hour at 0° C. and for 1½ hours at room temperature. Most of the methanol is then removed by distillation at about 40° C. under vacuum. Water is added to the semi-solid residue and the resulting mixture extracted with ether. The ether extracts are combined, washed with water, dried over anhydrous sodium sulfate and finally evaporated to dryness to give 9.13 g. of 2-(δ-hydroxybutyl)-2-methoxy-6-methyl tetrahydropyran as a colorless liquid.

EXAMPLE 13

2-(δ-p-toluenesulfonyloxy)-2-methoxy-6-methyl tetrahydropyran

To a stirred solution of 8.526 g. of 2-methoxy-2-(4'-hydroxybutyl)-6-methyl tetrahydropyran in 40 ml. of dry pyridine there is added at 0° C. 16.205 g. of purified p-toluenesulfonyl chloride under an atmosphere of nitrogen. The clear solution immediately becomes heterogenous due to the separation of pyridine hydrochloride. The reaction mixture is stirred for 17 hours at about 5° C. and then poured into an ice-water mixture containing 38.64 g. of sodium bicarbonate. The mixture is stirred for 1½ hours, then extracted with diethyl ether. The ether extracts are combined, washed with 5% aqueous sodium carbonate, dried over anhydrous sodium sulfate and evaporated to dryness at about 40° C. in vacuo. There is obtained a residue containing 2-(δ-p-toluenesulfonyloxy)-2-methoxy-6-methyl tetrahydropyran. The product, obtained as described above, is sometimes accompanied by minor amounts of the enol ether and hydroxy ketone forms; the latter two forms are converted to the tetrahydropyran form by treatment of the entire product with 1% methanolic hydrogen chloride.

EXAMPLE 14

2-(δ-bromobutyl)-2-methoxy-6-methyl tetrahydropyran

A stirred solution of 9.368 g. of 2-(δ-p-toluenesulfonyloxy)-2-methoxy-6-methyl tetrahydropyran and 55 ml. of dry methanol containing 6.761 g. of sodium bromide is gently refluxed for 5 hours under an atmosphere of nitrogen. A fine precipitate of sodium bromide appears immediately after the refluxing is started; this redissolves in about one hour and thereafter crystalline sodium p-toluene sulfonate appears. After 5 hours the mixture is filtered and the filtrate concentrated in vacuo to dryness; the residue is dissolved in ether, filtered and evaporated to dryness to yield an oily material which is dissolved in 1% methanolic hydrogen bromide. The methanol solution is neutralized with solid sodium bicarbonate, concentrated to dryness in vacuo and the residue dissolved in ether. The ethereal solution is filtered and the filtrate then concentrated to dryness. There is obtained 2-(δ-bromobutyl)-2-methoxy-6-methyl tetrahydropyran.

EXAMPLE 15

2-methoxy-6-methyl tetrahydropyran-2-butyl triphenyl phosphonium bromide

A mixture of 3.975 g. of 2-(δ-bromobutyl)-2-methoxy-6-methyl tetrahydropyran, 4.338 g. triphenyl-phosphine and 30 ml. of dry methanol is heated at reflux for 20 hours under an atmosphere of nitrogen. At the end of this time most of the methanol is removed by evaporation at 40° C. under vacuum. To the resulting residue there is added dry benzene to precipitate the desired phosphonium salt. The benzene layer is decanted, and the residue washed with fresh benzene. The residue is then concentrated to a light yellow foam containing predominantly 2 - methoxy-6-methyl tetrahydropyran-2-butyl triphenyl phosphonium bromide and a minor amount of open-ring hydroxy ketone form. In order to convert this hydroxy ketone form of the phosphonium bromide to the tetrahydropyran form, the material is treated with 30 ml. of 1% methanolic hydrogen bromide for 3 hours at room temperature. An ethereal solution of diazomethane is then added to decompose hydrobromic acid and the reaction mixture is then evaported to dryness in vacuo to yield 2 - methoxy-6-methyl tetrahydropyran-2-butyl triphenyl phosphonium bromide as a foam.

EXAMPLE 16

1-(3,5-dimethoxy-6-carboxyphenyl)-10-hydroxy-1-undecen-6-one

A 2.35 molar solution of methylsulfinl carbanion in dimethylsulfoxide is prepared in known manner from dimethyl sulfoxide and sodium hydride.

4.01 ml. of this 2.35 molar solution of methylsulfinyl carbanion in dimethyl sulfoxide is added to a stirred solution of 4.972 g. (0.00942 mole) of 2-methoxy-6-methyl tetrahydropyran-2-butyl triphenyl phosphonium bromide in 12 ml. of dry dimethyl sulfoxide. The resulting deep red solution is stirred for 10 minutes under $N_2$ at room temperature, during which time the corresponding phosphorane is formed. A solution of sodium-2-formyl-4,6-dimethoxybenzoate is prepared by adding 4.01 of the 2.35 molar solution of methyl sulfinyl carbanion in dimethyl sulfoxide to 1.981 g. of 2-formyl-4,6-dimethoxybenzoic acid (VIII) in 10 ml. of dimethyl sulfoxide. This latter solution of benzoate salt is added with stirring to the above solution of phosphorane. The resulting reaction mixture is stirred at room temperature for 15 hours. It is then diluted with about an equal volume of water and extracted with ether. The ether layer is removed; the aqueous alkaline layer is made just acidic with dilute aqueous hydrochloric acid and extracted with fresh ether. This latter ethereal extract is extracted with 5% aqueous sodium bicarbonate and the resulting aqueous alkaline solution made just acidic with dilute hydrochloric acid. This aqueous acidic solution is extracted with ether. This latter ether extract is washed with a saturated aqueous solution of sodium chloride, dried over anhydrous sodium sulfate and finally evaporated to dryness in vacuo to afford a residue consisting of 1-(3,5-dimethoxy-6-carboxyphenyl)-10-hydroxy-1-undecen - 6 - one. As determined by the NMR spectrum this product is a mixture of geometrical isomers containing predominantly the transisomer.

EXAMPLE 17 d,l-Zearalenone dimethyl ether 20 ml. of trifluoroacetic anhydride is added dropwise over 1 hour to a stirred cold (10° C.) solution of 10.0 g. of racemic seco acid, i.e. 1-(3,5-dimethoxy-6-carboxyphenyl)-10-hydroxy-1 - undecen - 6 - one in 28 ml. of benzene. The addition is carried out in a nitrogen atmosphere. The cooling bath is then removed and the mixture is stirred for an additional hour. It is then cooled to 10° C. and 5% aqueous sodium hydroxide is added (about 200 ml.) with stirring until the mixture is basic. The layers are separated, the aqueous layer is extracted twice with benzene, and the combined benzene layer and extracts washed twice with water, once with saturated sodium chloride solution, dried over magnesium sulfate and concentrated to dryness under vacuum. The residue is dissolved in chloroform and chromatographed on about 150 g. of silica gel H. The column is eluted with chloroform containing 4% acetone. The fractions containing the d,l-Zearalenone dimethyl ether (as determined by thin layer chromatography) are combined and concentracted to dryness in vacuo. The residue thus obtained is crystallized from 9:1 ether-acetone to give pure d,l-Zearalenone dimethyl ether.

EXAMPLE 18 d,l-Zearalenone

To a stirred solution of 120 mg. of d,l-Zearalenone dimethyl ether in 1.2 ml. of methylene chloride under nitrogen at 0° C. there is added a cooled (0° C.) solution of 0.5 ml. of boron tribromide in 0.8 ml. of methylene chloride. The cooling bath is removed and after 5 minutes the reaction mixture is concentrated to dryness under water pump vacuum (bath temperature 30° C.). The resulting solid residue is triturated with 5 ml. of water and the precipitate filtered, washed with water and dried under vacuum to give 121 mg. of crude d,l-Zearalenone. The product is purified by preparative thin layer chromatography on silica gel G coated glass plates using chloroform 5% acetonitrile as the developing solvent. The product is removed from the glass plates, dissolved in a minimum volume of acetone, and hexane added to the acetone solution until crystallization begins. The crystalline product is filtered off and dried to give pure d,l-Zearalenone.

EXAMPLE 19 d,l-Zearalenone-4-monomethyl ether

To a stirred solution of 480 mg. d,l-Zearalenone dimethyl ether in 5 ml. of methylene chloride under nitrogen at 0° C. there is added a cooled (0° C.) solution of 2 ml. of boron tribromide in 2 ml. of methylene chloride. The reaction mixture is immediately poured onto 50 ml. of crushed ice with stirring. The mixture is made basic with potassium bicarbonate and extracted with methylene chloride. The latter extract is washed with saturated aqueous sodium chloride, dried over magnesium sulfate and taken to dryness under vacuum. Thin layer chromatography (silica gel G chloroform 5% acetonitrile) shows the presence of a minor amount of d,l-Zearalenone and a major amount of d,l-Zearalenone-4-monomethyl ether. The monomethyl ether is isolated and purified by preparative thin layer chromatography (as described in Example 18) to afford substantially pure material.

Although the instant invention has been illustrated above specifically in terms of the preparation and utilization of dimethyl ethers of homophthalic acid, it will be obvious, of course, to anyone skilled in the art that where compounds bearing loweralkoxy substituents other than methoxy are desired, it is merely necessary to select the appropriate 5,7-diloweralkoxy-1-indanone as the starting material. The term loweralkoxy as used herein is intended to include both straight and branched chain alkoxide groups having from 1 to 6 carbon atoms in the alkyl moiety. Typical of such groups are, for example, methoxy, ethoxy, propoxy, butoxy, isobutoxy, and the like. Such 5,7-diloweralkoxy indanones are either well known compounds per se or may be readily prepared by conventional techniques fully described in the art.

Further, from a study of the foregoing description, many modifications in the process of the instant invention will suggest themselves to one skilled in the art. It will be obvious, for example, that indanones bearing substituents other than alkoxy in the 5 and 7-positions may be employed to prepare correspondingly substituted homophthalic acids according to the process of this invention and that such homophthalic acids may be employed, again according to the process of the instant invention, as intermediates in the total synthesis of d,l-Zearalenones. Typical of groups which may be substituted for the alkoxy group are, for example, aryloxy groups such as phenoxy, aralkoxy groups such as benzyloxy and triphenylmethoxy and loweralkanoyloxy groups such as acetoxy and propanoyloxy. Applicants consider all such obvious modifications to be the full equivalent of the embodiments specifically described herein and to fall within the scope of their invention.

The subject matter which applicants regard as their invention is particularly pointed out and distinctly claimed as follows.

1. The process for preparing a 3,5 - diloweralkoxy homophthalic acid which comprises:
   (a) treating a 5,7-diloweralkoxy-1-indanone with an alkyl nitrite in the presence of a catalyst selected from the group consisting of a concentrated mineral acid and an alkali metal alkoxide to produce the corresponding 5,7-diloweralkoxy - 2 - oximino-1-indanone; and
   (b) treating said oximino indanone with formaldehyde in the presence of concentrated mineral acid to produce the corresponding 5,7 - diloweralkoxy - 1,2 - indandione; and
   (c) treating said indandione in the presence of acetic acid with an oxidizing agent selected from the group consisting of hydrogen peroxide in a lower alkanoic acid and an organic per acid in an inert organic solvent at reduced temperatures to produce the corresponding 3,5-diloweralkoxy homophthalic acid.

2. The process of claim 1 wherein the 5,7-diloweralkoxy-1-indandione is 5,7-dimethoxy-1-indandione.

3. The process of claim 2 wherein the alkyl nitrite is isoamyl nitrite.

4. The process of claim 3 wherein the mineral acid catalyst is hydrochloric acid.

5. The process of claim 3 wherein the alkali metal alkoxide catalyst is sodium isoamyloxide.

6. The process of claim 4 wherein the oxidizing agent is hydrogen peroxide in acetic acid.

7. The process of claim 5 wherein the oxidizing agent is hydrogen peroxide in acetic acid.

8. The process for preparing a 3,5-diloweralkoxy homophthalic acid which comprises treating a 5,7-diloweralkoxy-1,2-indandione with an oxidizing agent selected from the group consisting of hydrogen peroxide in a lower alkanoic acid and an organic per acid in an inert organic solvent at reduced temperatures.

9. The process of claim 8 wherein the 5,7-diloweralkoxy-1,2-indandione is 5,7-dimethoxy-1,2-indandione.

10. The process of claim 9 wherein the oxidizing agent is hydrogen peroxide in acetic acid.

References Cited

UNITED STATES PATENTS 3,373,034  3/1968  Hodge et al. _____ 260—343.2

JAMES A. PATTEN, Primary Examiner

U.S. Cl. X.R.

260—343.2; 345.1, 345.9, 465, 479, 566, 590, 594